(12) United States Patent
Kim et al.

(10) Patent No.: US 12,211,991 B2
(45) Date of Patent: Jan. 28, 2025

(54) NEGATIVE ELECTRODE FOR ALL-SOLID-STATE BATTERY AND METHOD FOR MANUFACTURING SAME

(71) Applicant: LG Chem, Ltd., Seoul (KR)

(72) Inventors: Eun-Bee Kim, Daejeon (KR); Ji-Hoon Ryu, Daejeon (KR); Jung-Pil Lee, Daejeon (KR); Vin-Na Jo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 968 days.

(21) Appl. No.: 17/267,256

(22) PCT Filed: Sep. 25, 2019

(86) PCT No.: PCT/KR2019/012465
§ 371 (c)(1),
(2) Date: Feb. 9, 2021

(87) PCT Pub. No.: WO2020/067717
PCT Pub. Date: Apr. 2, 2020

(65) Prior Publication Data
US 2021/0313558 A1    Oct. 7, 2021

(30) Foreign Application Priority Data
Sep. 27, 2018    (KR) .......................... 10-2018-0115003

(51) Int. Cl.
*H01M 4/139* (2010.01)
*H01M 4/04* (2006.01)
(Continued)

(52) U.S. Cl.
CPC ......... *H01M 4/139* (2013.01); *H01M 4/0402* (2013.01); *H01M 4/62* (2013.01);
(Continued)

(58) Field of Classification Search
CPC ...... H01M 4/139; H01M 4/0402; H01M 4/62; H01M 10/0525; H01M 10/0565;
(Continued)

(56) References Cited

U.S. PATENT DOCUMENTS

2009/0280410 A1    11/2009    Zaguib et al.
2013/0284988 A1    10/2013    Satake et al.
(Continued)

FOREIGN PATENT DOCUMENTS

CN    105190958 A    12/2015
CN    105336914 A    2/2016
(Continued)

OTHER PUBLICATIONS

The Notice of SIPO to grant a Patent for Application CN 201980028257 (Year: 2024).*
(Continued)

*Primary Examiner* — Alexander Usyatinsky
(74) *Attorney, Agent, or Firm* — Lerner David LLP (57) ABSTRACT

The present disclosure relates to a method for manufacturing a negative electrode for an all solid state secondary battery, including the steps of: (S1) preparing a preliminary negative electrode including: a current collector; and a negative electrode active material layer formed on at least one surface of the current collector, and containing a plurality of negative electrode active material particles and a solid electrolyte; (S2) disposing a lithium layer on the negative electrode active material layer; (S3) dipping the preliminary negative electrode having the lithium layer disposed thereon in an organic solvent; and (S4) removing the lithium layer. The present disclosure also relates to a negative electrode for an all solid state secondary battery obtained by the method. The
(Continued)

negative electrode for an all solid state secondary battery provides improved initial efficiency and cycle characteristics.

14 Claims, 2 Drawing Sheets

(51) Int. Cl.
| | | |
|---|---|---|
| *H01M 4/62* | (2006.01) | |
| *H01M 10/0525* | (2010.01) | |
| *H01M 10/0565* | (2010.01) | |
| *H01M 10/0585* | (2010.01) | |
| *H01M 4/02* | (2006.01) | |

(52) U.S. Cl.
CPC ... *H01M 10/0525* (2013.01); *H01M 10/0565* (2013.01); *H01M 10/0585* (2013.01); *H01M 2004/021* (2013.01); *H01M 2004/027* (2013.01); *H01M 2300/0082* (2013.01)

(58) Field of Classification Search
CPC ....... H01M 10/0585; H01M 2004/021; H01M 2004/027; H01M 2300/0082
See application file for complete search history.

(56) References Cited

U.S. PATENT DOCUMENTS

| | | | |
|---|---|---|---|
| 2013/0327648 A1 | 12/2013 | Grant et al. | |
| 2015/0364795 A1 | 12/2015 | Stefan et al. | |
| 2016/0126543 A1 | 5/2016 | Ota et al. | |
| 2016/0141596 A1* | 5/2016 | Uhm ................... | H01M 4/0435 |
| | | | 429/231.95 |
| 2016/0181594 A1 | 6/2016 | Balogh et al. | |
| 2017/0133712 A1 | 5/2017 | Mimura et al. | |
| 2017/0187030 A1* | 6/2017 | Grant ................... | C25D 7/0657 |
| 2017/0250405 A1* | 8/2017 | Esaki ................... | C01G 23/005 |
| 2017/0338476 A1 | 11/2017 | Newbound et al. | |
| 2018/0047981 A1* | 2/2018 | Ito .......................... | H01M 4/582 |
| 2021/0230441 A1 | 7/2021 | Yan et al. | |

FOREIGN PATENT DOCUMENTS

| | | | |
|---|---|---|---|
| CN | 106449140 | A | 2/2017 |
| CN | 107658428 | A | 2/2018 |
| CN | 108565396 | A | 9/2018 |
| JP | 2013069415 | A | 4/2013 |
| JP | 2015002079 | A | 1/2015 |
| JP | 201538877 | A | 2/2015 |
| JP | 201635911 | A | 3/2016 |
| JP | 2016522547 | A | 7/2016 |
| JP | 2016192385 | * | 10/2016 |
| JP | 2016192385 | A | 11/2016 |
| JP | 2017050248 | A | 3/2017 |
| JP | 2017513787 | A | 6/2017 |
| JP | 2017534164 | A | 11/2017 |
| KR | 20150014676 | A | 2/2015 |
| KR | 20170020850 | A | 2/2017 |
| KR | 101771279 | B1 | 8/2017 |
| KR | 101850901 | B1 | 4/2018 |
| WO | 9632754 | A1 | 10/1996 |
| WO | 2016054105 | A1 | 4/2016 |
| WO | 2016157743 | A1 | 10/2016 |

OTHER PUBLICATIONS

Extended European Search Report for Application No. 19864596.2 dated Jun. 16, 2021. 48 pgs.
International Search Report for PCT Application PCT/KR2019/012465 dated Dec. 27, 2019.

* cited by examiner

NEGATIVE ELECTRODE FOR ALL-SOLID-STATE BATTERY AND METHOD FOR MANUFACTURING SAME

CROSS-REFERENCE TO RELATED APPLICATION(S)

This application is a national phase entry under 35 U.S.C. § 371 of International Application No. PCT/KR2019/012465 filed Sep. 25, 2019, which claims priority from Korean Patent Application No. 2018-0115003 filed Sep. 27, 2018, all of which are incorporated herein by reference.

TECHNICAL FIELD

The present disclosure relates to a negative electrode for an all solid state secondary battery and a method for manufacturing the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Such a lithium secondary battery has used a liquid electrolyte, such as a combustible organic solvent, according to the related art. However, in a battery using a liquid electrolyte, it is likely that leakage of the electrolyte, ignition or explosion occurs.

To solve the above-mentioned problem and to ensure essential safety, active studies have been conducted about use of a solid electrolyte instead of a liquid electrolyte. A secondary battery using solid materials for all constitutional elements including an electrolyte is called 'all solid state second battery'. Such an all solid state secondary battery has been spotlighted as a next-generation lithium secondary battery, in terms of safety, high energy density, high output and simplification of manufacturing processes.

However, such an all solid state secondary battery is problematic in that side reactions in a negative electrode are increased due to the low reducing property of a solid electrolyte to cause a decrease in initial efficiency and degradation of performance.

DISCLOSURE

Technical Problem

The present disclosure is designed to solve the problems of the related art, and therefore the present disclosure is directed to providing a negative electrode for an all solid state secondary battery which provides improved initial efficiency and life characteristics, and a method for manufacturing the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a method for manufacturing a negative electrode for an all solid state secondary battery according to any one of the following embodiments.

According to the first embodiment of the present disclosure, there is provided a method for manufacturing a negative electrode for an all solid state secondary battery, including the steps of:

(S1) preparing a preliminary negative electrode including: a current collector; and a negative electrode active material layer formed on at least one surface of the current collector, and containing a plurality of negative electrode active material particles and a solid electrolyte;

(S2) disposing a lithium layer on the negative electrode active material layer;

(S3) dipping the preliminary negative electrode having the lithium layer disposed thereon in an organic solvent; and (S4) removing the lithium layer.

According to the second embodiment of the present disclosure, there is provided the method for manufacturing a negative electrode for an all solid state secondary battery as defined in the first embodiment, wherein the organic solvent includes a benzene-based solvent; ether-based solvent; ester-based solvent; amide-based solvent; linear carbonate-based solvent; cyclic carbonate-based solvent; or a mixture of two or more of them.

According to the third embodiment of the present disclosure, there is provided the method for manufacturing a negative electrode for an all solid state secondary battery as defined in the first or the second embodiment, wherein an additive is further added to the organic solvent, in step (S3).

According to the fourth embodiment of the present disclosure, there is provided the method for manufacturing a negative electrode for an all solid state secondary battery as defined in the third embodiment, wherein the additive includes vinylene carbonate (VC), vinylene ethylene carbonate (VEC), propane sultone (PS), fluoroethylene carbonate (FEC), ethylene sulfate, lithium difluoro(oxalate)borate (LiODFB), $LiBF_4$, LITFSL, LiBOB, LiODFB, or a mixture of two or more of them.

According to the fifth embodiment of the present disclosure, there is provided the method for manufacturing a negative electrode for an all solid state secondary battery as defined in any one of the first to the fourth embodiments, wherein the solid electrolyte has an ion conductivity of $10^{-7}$ S/cm or more, and includes a polymer-based solid electrolyte, oxide-based solid electrolyte, sulfide-based solid electrolyte, or a mixture of two or more of them.

According to the sixth embodiment of the present disclosure, there is provided the method for manufacturing a negative electrode for an all solid state secondary battery as defined in any one of the first to the fifth embodiments, wherein pre-lithiation is carried out by dipping the preliminary electrode having the lithium layer disposed thereon in the organic solvent.

According to the seventh embodiment of the present disclosure, there is provided the method for manufacturing a negative electrode for an all solid state secondary battery as defined in any one of the first to the sixth embodiments, wherein the pre-lithiation is controlled by adjusting the amount of the lithium layer or time.

According to the eighth embodiment of the present disclosure, there is provided the method for manufacturing a negative electrode for an all solid state secondary battery as defined in any one of the first to the seventh embodiments, wherein the lithium layer is retained on the negative electrode active material layer for 6-48 hours.

According to the ninth embodiment of the present disclosure, there is provided the method for manufacturing a negative electrode for an all solid state secondary battery as defined in any one of the first to the eighth embodiments, which further includes a step of removing the organic solvent after step (S3) or (S4).

According to the tenth embodiment of the present disclosure, there is provided the method for manufacturing a negative electrode for an all solid state secondary battery as defined in any one of the first to the ninth embodiments, wherein the organic solvent is a cyclic carbonate.

In another aspect of the present disclosure, there is also provided a negative electrode for an all solid state secondary battery as defined in the following embodiment.

According to the eleventh embodiment of the present disclosure, there is provided a negative electrode for an all solid state secondary battery obtained by the method as defined in any one of the first to the tenth embodiments, which includes: a current collector; and a negative electrode active material layer formed on at least one surface of the current collector, and containing a plurality of negative electrode active material particles and a solid electrolyte, wherein the negative electrode active material layer has a solid electrolyte interphase (SEI) layer formed on the whole or at least a part of the surface of the negative electrode active material particles.

In still another aspect of the present disclosure, there is also provided an all solid state secondary battery as defined in any one of the following embodiments.

According to the twelfth embodiment of the present disclosure, there is provided an all solid state secondary battery including: a positive electrode; a negative electrode; and a solid electrolyte membrane interposed between the positive electrode and the negative electrode, wherein the negative electrode is the negative electrode for an all solid state secondary battery as defined in the eleventh embodiment.

According to the thirteenth embodiment of the present disclosure, there is provided the all solid state secondary battery as defined in the twelfth embodiment, which has an initial efficiency of 80% or more.

According to the fourteenth embodiment of the present disclosure, there is provided the all solid state secondary battery as defined in the twelfth or the thirteenth embodiment, which has a capacity retention of 75% or more.

Advantageous Effects

The method for manufacturing a negative electrode for an all solid state secondary battery according to the present disclosure includes disposing a lithium layer on a negative electrode active material layer and dipping the electrode in an organic solvent free of a lithium salt to carry out pre-lithiation and to form a solid electrolyte interphase (SEI) layer. As a result, it is possible to provide improved initial efficiency.

The method for manufacturing a negative electrode for an all solid state secondary battery according to the present disclosure can provide improved cycle characteristics as well as improved initial efficiency.

In addition, it is possible to provide a negative electrode for an all solid state secondary battery obtained by the above-mentioned method, and an all solid state secondary battery including the same.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part ⌈includes⌋ an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In a negative electrode used for an all solid state secondary battery, a graphite-based material may be used. However, when using a graphite-based material as a negative electrode material, the negative electrode material causes side reactions with a solid electrolyte due to the low reduction stability of the electrolyte, resulting in the problems of a decrease in initial efficiency and degradation of cycle characteristics.

To solve the above-mentioned problems, a lithium layer is disposed on a negative electrode active material layer and the resultant preliminary negative electrode having the lithium layer disposed thereon is dipped in an organic solvent according to the present disclosure.

Therefore, the negative electrode for an all solid state secondary battery according to the present disclosure improves initial efficiency by virtue of pre-lithiation, and has a solid electrolyte interphase (SEI) layer on the whole or at least a part of the surface of negative electrode active material particles to improve life characteristics.

In one aspect of the present disclosure, there is provided a method for manufacturing a negative electrode for an all solid state secondary battery, including the steps of:
(S1) preparing a preliminary negative electrode including: a current collector; and a negative electrode active material layer formed on at least one surface of the current collector, and containing a plurality of negative electrode active material particles and a solid electrolyte;
(S2) disposing a lithium layer on the negative electrode active material layer;
(S3) dipping the preliminary negative electrode having the lithium layer disposed thereon in an organic solvent; and
(S4) removing the lithium layer.

Hereinafter, the method for manufacturing a negative electrode for an all solid state secondary battery according to an embodiment of the present disclosure will be explained in detail.

First, a preliminary negative electrode including: a current collector; and a negative electrode active material layer formed on at least one surface of the current collector, and containing a plurality of negative electrode active material particles and a solid electrolyte is prepared (S1).

In one aspect, the present disclosure relates to a method for manufacturing a negative electrode for an all solid state secondary battery, wherein the negative electrode includes a solid electrolyte in the negative electrode active material layer.

The solid electrolyte may be in the form of particles.

In a system to which a liquid electrolyte is injected according to the related art, a solid electrolyte interphase (SEI) layer is formed uniformly at the interface between the liquid electrolyte and the negative electrode active material upon the initial charge. This results from the injection of the liquid electrolyte. Thus, it is possible to accomplish an initial efficiency of about 90%. Herein, the electrolyte includes an organic solvent and a lithium salt. In addition, since a stable SEI layer is formed upon the initial charge, it is possible to reduce side reactions caused by repeated cycles. It is also possible to control the resistance at the interface with the negative electrode active material, thereby providing excellent cycle characteristics.

On the contrary, in the all solid state secondary battery according to the present disclosure, no liquid electrolyte is injected and all constitutional elements contained in the battery are solid. Particularly, in a negative electrode for an all solid state secondary battery, a solid electrolyte is contained in the negative electrolyte, unlike the conventional liquid electrolyte system. Since the electrolyte is in a solid state, resistance is generated at the interface between the negative electrode active material particles and the solid electrolyte. In addition, unlike the injection of a liquid electrolyte, the surface of negative electrode active material particles is not uniformly surrounded with the solid electrolyte. Therefore, even after the initial charge process, a uniform SEI layer is not formed or a portion of the negative electrode active material surface may have no SEI layer. Due to the above-mentioned problems, there are problems of low initial efficiency and degradation of cycle characteristics. Furthermore, in this case, the initial efficiency is merely 50-60% due to the low reduction stability of the solid electrolyte itself upon the initial charge.

The present disclosure is intended to overcome the limitation of the all solid state secondary battery and can improve the initial efficiency and cycle characteristics of an all solid state secondary battery as described hereinafter. As a result, it is possible to provide initial efficiency equal to or similar to the initial efficiency of the lithium secondary battery to which a liquid electrolyte is injected.

According to an embodiment of the present disclosure, the solid electrolyte may have an ion conductivity of $10^{-7}$ S/cm or more, or preferably $10^{-5}$ S/cm or more, and particular examples thereof may include a polymeric solid electrolyte, oxide-based solid electrolyte, sulfide-based solid electrolyte, or a mixture of two or more of them.

According to an embodiment of the present disclosure, the solid electrolyte functions to transport lithium ions in the electrode, and thus it may be a material having high ion conductivity, such as an ion conductivity of $10^{-5}$ S/cm or more, or $10^{-4}$ S/cm or more.

According to an embodiment of the present disclosure, the polymeric solid electrolyte may include a solid polymer electrolyte and a lithium salt.

For example, the solid polymer electrolyte may be one formed by adding a lithium salt to a polymer containing a hetero-atom, such as oxygen, nitrogen or sulfur, so that the dissociated ions of salt may be transported in the polymer.

According to an embodiment of the present disclosure, the polymeric solid electrolyte may include a solid polymer electrolyte formed by adding a polymer resin to a solvated lithium salt.

According to an embodiment of the present disclosure, the polymer resin may include a polyether polymer, polycarbonate polymer, acrylate polymer, polysiloxane polymer, phosphazene polymer, polyethylene derivatives, alkylene oxide derivatives, such as polyethylene oxide, phosphate polymer, polyagitation lysine, polyester sulfide, polyvinyl alcohol, polyvinylidene fluoride, a polymer containing an ionically dissociable group, or a mixture of two or more of them.

According to another embodiment of the present disclosure, the solid polymer electrolyte may include a branched copolymer including polyethylene oxide (PEO) backbone copolymerized with a comonomer including an amorphous polymer, such as PMMA, polycarbonate, polydiloxane (pdms) and/or phosphazene, comb-like polymer and cross-linked polymer resin, or a mixture of two or more of them, as the polymer resin.

According to an embodiment of the present disclosure, the lithium salt may include $Li^+$ as cation, and at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3S\ O_2)_3C^-$, $CF_3(CF_2)_7SO_3^-$, $CF_3CO_2^-$, $CH_3CO_2^-$, $SCN^-$ and $(CF_3CF_2SO_2)_2N^-$, as anion.

According to an embodiment of the present disclosure, the sulfide-based solid electrolyte includes sulfur (S) and may include a metal that belongs to Group 1 or Group 2 elements in the Periodic Table. Herein, the metal preferably has ion conductivity and electron insulation property.

According to an embodiment of the present disclosure, the sulfide-based solid electrolyte may be a lithium ion conductive solid electrolyte including a compound represented by the following Chemical Formula 1:

$$L_{a1}M_{b1}P_{c1}S_{d1}A_{e1} \quad \text{[Formula 1]}$$

wherein L represents an element selected from Li, Na and K, preferably Li; M represents an element selected from B, Zn, Sn, Si, Cu, Ga, Sb, Al and Ge, preferably an element selected from B, Sn, Si, Al and Ge, and more preferably an element selected from Sn, Al and Ge; A represents I, Br, Cl or F, preferably I or Br, and more preferably I; each of a1-e1 represents the compositional ratio of each element, and a1:b1:c1:d1:e1 satisfies 1-12:0-1:1:2-12:0-5, wherein a1 is preferably 1-9, and more preferably 1.5-4, b1 is preferably 0-0.5, c1 is preferably 1, d1 is preferably 3-7, and more preferably 3.25-4.5, and e1 is preferably 0-3, and more preferably 0-1.

According to an embodiment of the present disclosure, the sulfide-based solid electrolyte includes Li, X and S, wherein X may include at least one selected from the group consisting of P, Ge, B, Si, Sn, As, Cl, F and I.

According to an embodiment of the present disclosure, the oxide-based solid electrolyte includes oxygen (O), and may include a metal that belongs to Group 1 or Group 2 elements in the Periodic Table. Herein, the metal preferably has ion conductivity and electron insulation property.

According to an embodiment of the present disclosure, the oxide-based solid electrolyte includes Li, A and O, wherein A may include at least one selected from the group consisting of La, Zr, Ti, Al, P and I.

According to an embodiment of the present disclosure, the sulfide- or oxide-based solid electrolyte may preferably have an average particle diameter of 0.01 μm or more, and more preferably 0.1 μm or more, but is not limited thereto. In addition, the average particle diameter may be preferably 100 μm or less, and more preferably 50 μm or less. The average particle diameter of the sulfide- or oxide-based solid electrolyte particles may be determined as follows.

First, water (heptane, in the case of a material unstable to water) is used to prepare dispersion containing 1 wt % of the solid electrolyte particles dispersed therein in a 20 mL sample bottle. Next, right after the dispersion is irradiated with ultrasonic waves at 1 kHz, it is used for the test. A laser diffraction/scattering particle size distribution analyzer (LA-920 available from HORIBA) is used to read the data of the dispersion by using a quartz test cell 50 times, and the resultant volumetric average particle diameter is taken as 'average particle diameter'. The other detailed conditions may refer to JISZ8828:2013, 'Particle diameter interpretation—Dynamic light scattering', if necessary.

Particularly, a polymeric solid electrolyte, which has insignificant reactivity with a solvent and facilitates solvent selection, is preferred.

According to an embodiment of the present disclosure, the negative electrode active material layer may further include a conductive material.

According to an embodiment of the present disclosure, the conductive material may be those used currently for manufacturing an electrode. Non-limiting examples of the conductive material include carbon nanotubes, acetylene black, carbon black, natural graphite, artificial graphite, Ketjen black or a combination thereof. However, the scope of the present disclosure is not limited thereto, and any conductive material used conventionally for an electrochemical device may be used with no particular limitation.

According to an embodiment of the present disclosure, the negative electrode active material layer may further include a binder polymer. Herein, the binder polymer may be any binder polymer used currently for manufacturing an electrode. Non-limiting examples of the binder polymer include polyvinylidene fluoride. However, the scope of the present disclosure is not limited thereto and any binder polymer used conventionally for an electrochemical device may be used with no particular limitation.

According to an embodiment of the present disclosure, the current collector may have a thickness of 3-500 μm. The current collector is not particularly limited, as long as it causes no chemical change in the corresponding battery and has high conductivity. For example, the current collector may be foil made of copper, nickel, copper alloy, or a combination thereof.

The negative electrode active material is not particularly limited, as long as it is a negative electrode active material used for a negative electrode for an electrochemical device. Particular examples of the negative electrode active material include lithium-intercalating materials, such as carbon, petroleum coke, activated carbon, graphite, or other carbonaceous materials.

The graphite may be natural graphite or artificial graphite.

According to an embodiment of the present disclosure, the negative electrode active material is preferably graphite with a view to forming a solid electrolyte interphase (SEI) layer stably.

Particularly, an organic solvent containing additives may react with the active material in the negative electrode to form a SEI layer. The formed SEI layer protects a lithium salt. Once the SEI layer is formed, it can prevent reactions between lithium ions and the negative electrode. According to the present disclosure, it is possible to prevent side reactions between the solid electrolyte and the negative electrode active material, and to improve the life characteristics.

Next, a lithium layer is disposed on the negative electrode active material (S2).

The lithium layer may be lithium metal and is used for the purpose of supplying lithium to the preliminary negative electrode.

As a method for disposing a lithium layer, deposition, plating, pressurization, adhesion, or the like, may be used. There is no particular limitation in the method, as long as it causes no damage at the preliminary electrode during the formation of the lithium layer or in the step of removing the lithium layer as described hereinafter.

Herein, the lithium layer may have a thickness of 20-200 µm, but the thickness is not a factor affecting the pre-lithiation.

Meanwhile, according to an embodiment of the present disclosure, the pre-lithiation may be controlled by adjusting the amount of lithium to be attached or the time during which the lithium layer is retained on the negative electrode active material layer.

For example, the pre-lithiation may be controlled by adjusting the amount of lithium as follows. The amount of lithium varies depending on the amount of the negative electrode active material loaded in the negative electrode. Therefore, the required amount of lithium may be calculated and disposed on the negative electrode active material layer.

In a variant, the pre-lithiation may be controlled by adjusting the time during which the lithium layer is retained on the negative electrode active material layer. Particularly, the lithium layer is attached to the negative electrode active material layer, and then it is checked whether pre-lithiation occurs to a desired degree or not. The lithium layer may be removed later.

After that, the preliminary negative electrode having the lithium layer disposed thereon is dipped in the organic solvent (S3).

As used herein, the organic solvent is an organic solvent free of lithium salt.

In the conventional liquid electrolyte system, a negative electrode including lithium attached thereto is dipped in an electrolyte containing a lithium salt to carry out pre-lithiation. In other words, pre-lithiation occurs after the transport of lithium ions, only when the electrolyte essentially includes a lithium salt.

On the contrary, in the method for manufacturing a negative electrode for an all solid state secondary battery according to an embodiment of the present disclosure, the organic solvent is free of lithium salt.

The preliminary negative electrode according to an embodiment of the present disclosure includes a solid electrolyte on the negative electrode active material layer as mentioned above. When such a preliminary negative electrode is dipped in a lithium salt-containing electrolyte, the solid electrolyte itself undergoes a change with the lapse of time. For example, the anions present in the lithium salt in the electrolyte chemically react with the solid electrolyte to cause a change in composition of the electrolyte. As a result, side reactions may occur so that the ion conductivity of the solid electrolyte may be reduced, or the solid electrolyte may be unstabilized.

In the method for manufacturing a negative electrode for an all solid state secondary battery according to an embodiment of the present disclosure, the preliminary negative electrode is dipped in an organic solvent free of lithium salt to prevent such side reactions. Since the solid electrolyte is present on the negative electrode active material layer in the preliminary negative electrode and lithium ions are present in the solid electrolyte, it is possible to carry out pre-lithiation smoothly.

According to an embodiment of the present disclosure, the organic solvent may be one having low reactivity with the preliminary negative electrode including the solid electrolyte, and showing high wettability of the preliminary negative electrode and high volatility.

Particularly, the wettability of the preliminary negative electrode with the organic solvent may be determined through a solvent dipping test.

Particularly, the organic solvent used for pre-lithiation is dropped on the preliminary negative electrode, and then the time required for the organic solvent to permeate through the preliminary negative electrode may be determined. Herein, the time may be preferably 1-10 minutes.

According to an embodiment of the present disclosure, as the time required for the organic solvent used for the pre-lithiation to permeate through the preliminary negative electrode is decreased in the solvent dipping test, wettability with the organic solvent is increased.

According to an embodiment of the present disclosure, it is preferred that the organic solvent has high volatility and wettability.

Particularly, as the time required for the organic solvent used for the pre-lithiation to permeate through the preliminary negative electrode is decreased, wettability with the organic solvent is increased.

For example, it can be said that the organic solvent has high volatility, when it leaves no residual solvent after drying it at a temperature of 60° C. or lower. In this context, the organic solvent may be a cyclic carbonate. Particularly, the organic solvent may be dimethyl carbonate having high volatility and wettability.

According to an embodiment of the present disclosure, the organic solvent may include a benzene-based solvent; ether-based solvent; ester-based solvent; amide-based solvent; linear carbonate-based solvent; cyclic carbonate-based solvent; or a mixture of two or more of them.

Particularly, the ether-based organic solvent may include dimethyl ether, diethyl ether, dipropyl ether, methyl ethyl ether, methyl propyl ether, ethyl propyl ether, 1,2-dimethoxyethane, or a mixture of two or more of them.

According to an embodiment of the present disclosure, the ester-based organic solvent may include methyl propionate, ethyl propionate, propyl propionate, butyl propionate, ethyl acetate, or a mixture of two or more of them.

According to an embodiment of the present disclosure, the linear carbonate-based organic solvent may include dimethyl carbonate (DMC), diethyl carbonate (DEC), dipropyl carbonate (DPC), ethylmethyl carbonate (EMC), methylpropyl carbonate (MPC), ethylpropyl carbonate (EPC) or a mixture of two or more of them.

According to an embodiment of the present disclosure, the cyclic carbonate-based organic solvent may include any one selected from the group consisting of ethylene carbonate, propylene carbonate, 1,2-butylene carbonate, 2,3-butylene carbonate, 1,2-pentylene carbonate, 2,3-pentylene carbonate, vinylene carbonate, vinylethylene carbonate and halides thereof, or a mixture of two or more of them.

According to an embodiment of the present disclosure, when the solid electrolyte is a sulfide-based solid electrolyte, the organic solvent preferably includes toluene, xylene, naphtha, benzene, chlorobenzene, or a mixture of two or more of them. Since a sulfide-based solid electrolyte has high reactivity with an organic solvent, it is required to use an organic solvent having lower reactivity in order to inhibit side reactions and to control the processing rate. In this context, xylene is preferred.

In the method for manufacturing a negative electrode for an all solid state secondary battery, pre-lithiation is performed after the preliminary negative electrode is dipped in the organic solvent. In this manner, it is possible to improve the initial efficiency of an all solid state secondary battery.

According to an embodiment of the present disclosure, the organic solvent may further include an additive.

The additives are used in order to assist stable formation of a SEI layer on the negative electrode active material particles.

Particularly, it is preferred to use an additive that allows reduction at a voltage of initial charge of about 1V during the pre-lithiation.

According to an embodiment of the present disclosure, the additive may include vinylene carbonate (VC), vinylene ethylene carbonate (VEC), propane sultone (PS), fluoroethylene carbonate (FEC), ethylene sulfate, lithium difluoro (oxalate)borate (LiODFB), $LiBF_4$, LITFSL, LiBOB, LiODFB, or a mixture of two or more of them.

When the organic solvent includes such additives according to the present disclosure, it is possible to form a stable SEI layer on the negative electrode active material particles, thereby providing improved cycle characteristics.

According to an embodiment of the present disclosure, the dipping time may be 1-24 hours.

Herein, the organic solvent may have a temperature of 25-60° C.

When the time and temperature satisfy the above-defined ranges, it is possible to form lithium stably on the whole or a part of the negative electrode active material particles, and to form a uniform SEI layer.

According to an embodiment of the present disclosure, the pre-lithiation and formation of a SEI layer are intended to reduce side reactions during initial charge and to prevent over-expression of charge capacity. To accomplish this, the amount of lithium to be used for pre-lithiation may be controlled by time. Particularly, the amount of lithium per unit area required for compensating for the initial charge capacity may be calculated and the dipping time may be calculated therefrom.

After the completion of the reaction, a step of removing the preliminary electrode from the electrolyte and drying it to remove the solvent may be further carried out. Herein, the solvent removal step may be carried out after step (S3) or (S4). The solvent may be removed through drying but is not limited thereto. Any method for drying the solvent known to those skilled in the art may be used with no particular limitation.

Finally, the lithium layer is removed (S4).

The method for removing the lithium layer is not particularly limited, and any method may be used with no particular limitation, as long as it causes no damages at the negative electrode for an all solid state secondary battery.

As described above, it is possible to control the pre-lithiation by adjusting the lithium layer-removing time according to the present disclosure.

For example, the lithium layer may be retained on the negative electrode active material layer for 6-48 hours.

In another aspect of the present disclosure, there is provided a negative electrode for an all solid state secondary battery obtained by the above-described method, the negative electrode for an all solid state secondary battery including: a current collector; and a negative electrode active material layer formed on at least one surface of the current collector, and containing a plurality of negative electrode active material particles and a solid electrolyte, wherein the negative electrode active material layer has a solid electrolyte interphase (SEI) layer formed on the whole or at least a part of the surface of the negative electrode active material particles.

According to an embodiment of the present disclosure, the negative electrode active material layer may further include a conductive material.

According to an embodiment of the present disclosure, the negative electrode active material layer may further include a binder polymer. Herein, the binder polymer may by any binder polymer used conventionally for manufacturing an electrode. Non-limiting examples of the binder polymer include polyvinylidene fluoride. However, the scope of the present disclosure is not limited thereto, and any binder polymer may be used with no particular limitation, as long as it is used conventionally for an electrode.

The positive electrode used in combination with the negative electrode for an all solid state secondary battery according to the present disclosure is not particularly limited, and may be obtained by binding a positive electrode active material to a positive electrode current collector according to the conventional method known to those skilled in the art.

According to an embodiment of the present disclosure, the positive electrode may include a current collector and a positive electrode active material layer formed on the surface of the current collector. The positive electrode active material layer may further include a positive electrode active material, solid electrolyte, binder and a conductive material.

In general, the positive electrode current collector is formed to have a thickness of 3-500 μm. The positive electrode current collector is not particularly limited, as long as it has high conductivity while not causing any chemical change in the corresponding battery. Particular examples of the current collector may include stainless steel, aluminum, nickel, titanium, baked carbon, aluminum or stainless steel surface-treated with carbon, nickel, titanium or silver, or the like. In addition, fine surface irregularities may be formed on the surface of the current collector to increase the adhesion of the positive electrode active material. The current collector may have various shapes, such as a film, sheet, foil, net, porous body, foam, non-woven body, or the like.

The positive electrode active material is not particularly limited, as long as it can be used for a positive electrode for an electrochemical device. For example, the positive electrode active material may include any one selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \le x<0.5$, $0 \le y<0.5$, $0 \le z<0.5$, and $0<x+y+z \le 1$), or a mixture of at least two of them.

The solid electrolyte contained in the positive electrode may be a polymer electrolyte, oxide-based solid electrolyte or a sulfide-based solid electrolyte.

According to an embodiment of the present disclosure, the positive electrode active material layer may further include a lithium salt.

According to an embodiment of the present disclosure, the lithium salt may include $Li^+$ as cation, and may include, as anion, at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $F_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3S\ O_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$ and $(CF_3CF_2SO_2)_2N^-$.

The binder is an ingredient which assists binding between the electrode active material and the conductive material and binding to the current collector. In general, the binder is added in an amount of 1-50 wt % based on the total weight of the electrode mixture. High-molecular weight polyacrylonitrile-acrylic acid copolymers may be used as a binder, but the scope of the present disclosure is not limited thereto. Other examples of the binder include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluororubber, various copolymers, or the like. However, the binder is not limited thereto, and any binder ingredient used conventionally for an electrochemical device may be used with no particular limitation.

In still another aspect of the present disclosure, there is provided an all solid state secondary battery including: a positive electrode; a negative electrode; and a solid electrolyte membrane interposed between the positive electrode and the negative electrode, wherein the negative electrode is the negative electrode for an all solid state secondary battery as described hereinabove.

Herein, the all solid state secondary battery may have an initial efficiency of 80% or more, 85% or more, or 90% or more.

Herein, the all solid state secondary battery may have a capacity retention of 75% or more, 78% or more, or 80% or more.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

1) Manufacture of Negative Electrode for all Solid State Secondary Battery

First, a copper current collector having a thickness of 20 μm was prepared, and a mixture (as negative electrode slurry) containing natural graphite as a negative electrode active material, styrene butadiene rubber (SBR) as a binder, carboxymethyl cellulose (CMC) as a dispersing agent, a conductive material, and polyethylene oxide (PEO) powder and lithium salt (bis-trifluoromethanesulfonimide, LiTFSI) powder as solid electrolytes at a weight ratio of 80:3:1.5:3:12.5 was applied onto the copper current collector in an amount of 400 mg/25 cm². Then, the negative electrode slurry was vacuum dried at about 120° C. for 24 hours to obtain a preliminary negative electrode.

Next, a lithium layer having a thickness of 30 μm was disposed on the negative electrode active material layer of the preliminary electrode through a lamination process.

The preliminary negative electrode was dipped in dimethyl carbonate as an organic solvent at a temperature of 42.5° C. for 12 hours.

Then, the lithium layer was removed. Herein, the retention time of the lithium layer was 12 hours.

2) Manufacture of Positive Electrode

First, 80 parts by weight of $LiNi_{0.8}Co_{0.1}Mn_{0.1}O_2$ (NCM811) as a positive electrode active material, 11 parts by weight of polyethylene oxide (PEO) as a solid electrolyte, 3 parts by weight of LITFSI as an electrolyte salt, 3 parts by weight of a conductive material (vapor grown carbon fibers, VGCF) and 3 parts by weight of a binder polymer (polyvinyliene difluoride, PVDF) were mixed, and N-methyl pyrrolidone as a solvent was further added considering viscosity to obtain positive electrode active material slurry.

The resultant positive electrode active material slurry was applied to an aluminum current collector having a thickness of 20 μm and vacuum dried at 120° C. for 24 hours to obtain a positive electrode.

3) Manufacture of Solid Electrolyte Membrane

A solid electrolyte membrane including polyethylene oxide mixed with lithium salt (bis-trifluoromethanesulfonimide, LiTFSI) powder at a ratio of 9:1 as solid electrolytes was prepared.

4) Manufacture of All Solid State Secondary Battery

The solid electrolyte membrane was interposed between the above-described negative electrode for an all solid state secondary battery and the positive electrode to obtain an all solid state secondary battery.

Example 2

An all solid state secondary battery was obtained in the same manner as Example 1, except that vinylene carbonate as an additive was added to the organic solvent, when manufacturing the negative electrode for an all solid state secondary battery.

Comparative Example 1

In Comparative Example 1, pre-lithiation was not carried out.

An all solid state secondary battery was obtained in the same manner as Example 1, except that a copper current collector having a thickness of 20 μm was prepared and negative electrode slurry containing natural graphite, SBR, CMC, a conductive material, and a mixture of PEO powder with lithium salt (LiTFSI) powder at a weight ratio of 80:3:1.5:3:12.5 was applied onto the copper current collector in an amount of 400 mg/25 cm², and then the negative electrode slurry was vacuum dried at about 120° C. for 24 hours to obtain a negative electrode for an all solid state secondary battery.

Comparative Example 2

An all solid state secondary battery was obtained in the same manner as Example 1, except that 1M of lithium salt ($LiPF_6$) was introduced to the organic solvent. In other words, Comparative Example 2 is an embodiment including introduction of a lithium salt to the organic solvent.

Test Examples

Each of the all solid state secondary batteries according to Examples 1 and 2 and Comparative Examples 1 and 2 was used to determine the initial efficiency and capacity retention according to the following method. The results are shown in Table 1.

Initial Efficiency

Initial efficiency of all solid state secondary battery (%)=(Discharge capacity of negative electrode at the first cycle/Charge capacity of negative electrode at the first cycle)×100

Capacity Retention

Each of the all solid state secondary batteries according to Examples 1 and 2 and Comparative Examples 1 and 2 was charged/discharged initially (first cycle) by using an electrochemical charger. Herein, each battery was charged to a voltage of 4.3V by applying electric current at a current density of 0.1 C-rate, and discharged at the same current density to 2.5V. Such charge/discharge cycles were repeated 100 times.

During the charge/discharge cycles, the voltage and capacity of the positive electrode and negative electrode contained in each battery were determined.

The capacity retention of each battery was calculated therefrom according to the following formula.

Figure 1:
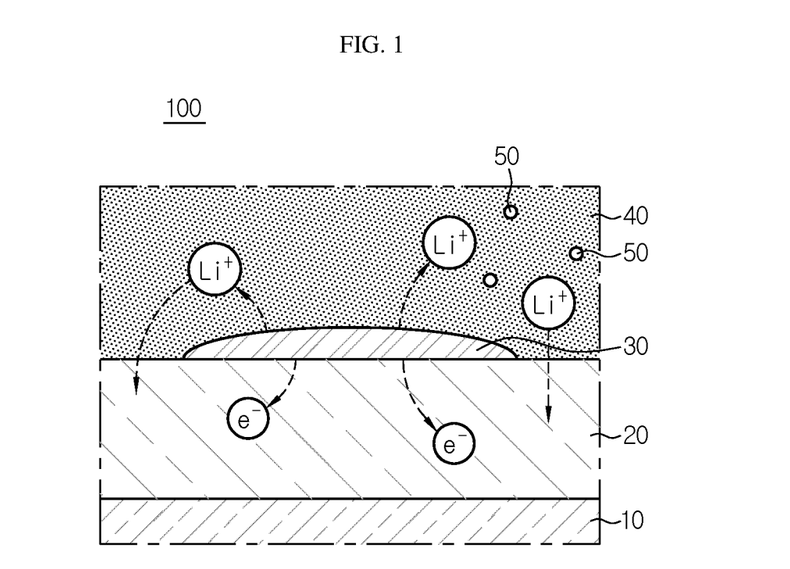
FIG. 1 is a schematic view illustrating the method for manufacturing a negative electrode for an all solid state secondary battery according to an embodiment of the present disclosure.
Figure 2:
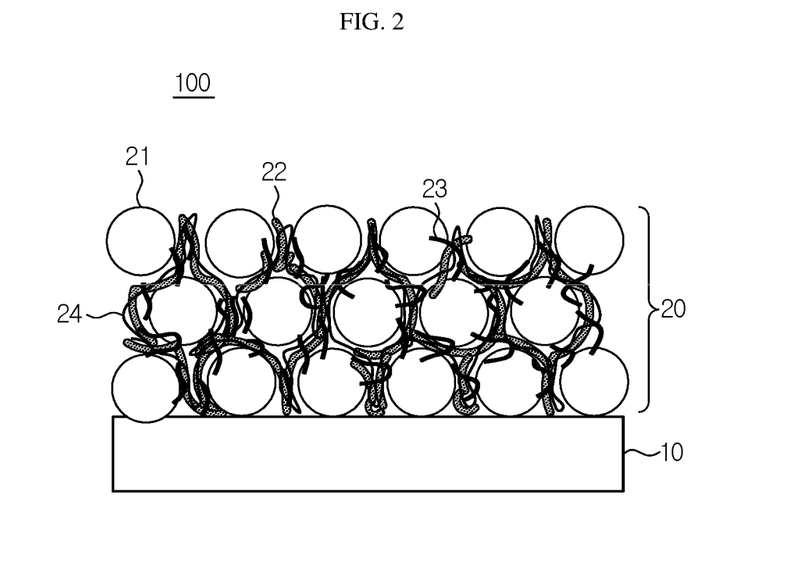
FIG. 2 is a schematic view illustrating the negative electrode for an all solid state secondary battery according to an embodiment of the present disclosure.

Capacity retention (%)=(Capacity at the 100$^{th}$ cycle/ Initial capacity)×100 state secondary batteries according to Examples 1 and 2 show a capacity retention of 75% or more, i.e. 80% and 85%, respectively. This can be seen from FIG. 1 and FIG. 2. Referring to FIG. 1, a negative electrode active material layer 20 is formed on a current collector 10, and a lithium layer 30 may be disposed on the negative electrode active material layer 20. Then, the preliminary negative electrode having the lithium layer 30 disposed thereon may be dipped in an organic solvent 40 containing additives 50 to cause pre-lithiation. Referring to FIG. 2, it can be seen that the

TABLE 1

| | Process for manufacturing negative electrode | | | Test data | | | | |
|---|---|---|---|---|---|---|---|---|
| | Pre-lithiation | Presence of solid electrolyte in negative electrode active material layer | Organic solvent composition | Charge capacity after 1$^{st}$ cycle (mAh/g) | Discharge capacity after 1$^{st}$ cycle (mAh/g) | Initial efficiency (%) | Life characteristics Capacity retention % (at 100 cycles 25° C., 0.1 C/ 0.1 C) | Note |
| Ex. 1 | ○ | ○ | Organic solvent 100% | 380 | 350 | 92.0 | 80 | Initial efficiency is improved and side reactions upon the first charge are reduced by pre-lithiation. |
| Ex. 2 | ○ | ○ | Organic solvent + additives | 389 | 351 | 90.2 | 85 | Initial efficiency is improved, side reactions upon the first charge are reduced, resistance is reduced, and life characteristics are improved by pre-lithiation and SEI layer formation. |
| Comp. Ex. 1 | X | ○ | X | 550 | 350 | 63.6 | 70 | Initial charge/discharge capacity is reduced after the 1st cycle due to side reactions of solid electrolyte, and resistance is not improved. |
| Comp. Ex. 2 | ○ | ○ | Organic solvent + additives + lithium salt | 462 | 291 | 63.0 | 55 | Electrolyte is changed with time due to reaction between lithium salt in organic solvent and solid electrolyte, and ion conductivity of electrolyte is reduced. |

As can be seen from Table 1, in the case of Examples 1 and 2, the initial efficiency of each negative electrode for an all solid state secondary battery is improved and side reactions upon the 1$^{st}$ charge are also reduced by virtue of the introduction of a lithium layer and dipping in an organic solvent. Particularly, in the case of Example 2, a SEI layer is formed on the negative electrode active material layer by virtue of the introduction of additives, and thus it is possible to provide an all solid state secondary battery having low resistance and improved life characteristics. Particularly, in the case of Examples 1 and 2, the all solid state secondary batteries show an initial efficiency of 80% or more, i.e. 92.0% and 90.2%, respectively. In addition, the all solid negative electrode active material layer has a SEI layer formed on the whole or at least a part of the surface of the negative electrode active material particles.

Figure 3:
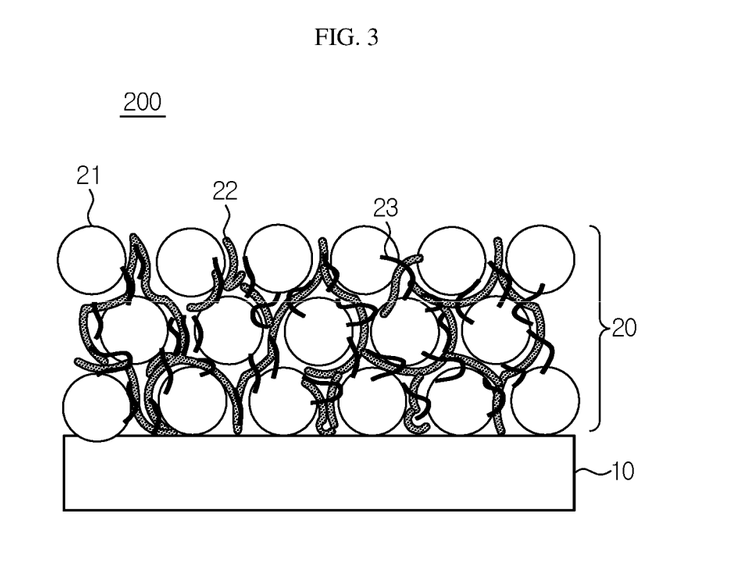
FIG. 3 is a schematic view illustrating the negative electrode for an all solid state secondary battery according to Comparative Example.

On the contrary, in the case of Comparative Example 1, no pre-lithiation is carried out. FIG. 3 is a schematic view illustrating the negative electrode for an all solid state secondary battery according to Comparative Example 1. Referring to FIG. 3, no SEI layer is formed on the whole or at least a part of the surface of the negative electrode active material particles, when no pre-lithiation is carried out. In this case, the initial efficiency is reduced rapidly due to the low reducing property of the solid electrolyte. Further, life characteristic is poor due to continuous side reactions and increased resistance.

In the case of Comparative Example 2 wherein the organic solvent includes a lithium salt, anions of the lithium salt cause side reactions with the solid electrolyte to cause a change in electrolyte with time and a decrease in ion conductivity of the electrolyte. As a result, Comparative Example 2 shows poor life characteristics (about 55%) and an initial efficiency of 63%, which is significantly lower as compared to Examples 1 and 2.

Determination of Change in Electrolyte with Time

Each of the all solid state secondary battery according to Example 2 and Comparative Example 2 was determined for a change in solid electrolyte with time.

Particularly, the solid electrolyte was dipped completely in ethylene carbonate (EC) as a solvent and aged therein for 12 hours. Then, the solvent was removed through filtering and vacuum drying was carried out at 40° C. for 12 hours to further remove the remaining solvent.

The solid electrolyte powder free of solvent was pelletized and the ion conductivity thereof was determined by using a hydraulic press under 10 MPa.

The results are shown in Table 2.

TABLE 2

| Unit (S/cm) | Before exposure | After exposure for 12 hours | After exposure for 24 hours |
|---|---|---|---|
| Example 2 | $5.0 \times 10^{-5}$ | $4.5 \times 10^{-5}$ | $4.0 \times 10^{-5}$ |
| Comp. Ex. 2 | $5.0 \times 10^{-5}$ | $6.0 \times 10^{-5}$ | $2.5 \times 10^{-5}$ |

As can be seen from Table 2, in the case of Example 2, there is no significant decrease in ion conductivity of the electrolyte even after 24 hours. On the contrary, in the case of Comparative Example 2, after 24 hours, the ion conductivity of the electrolyte is reduced to 1/20 based on the ion conductivity before exposure.

DESCRIPTION OF DRAWING NUMERALS 100, 200: Negative electrode for all solid state secondary battery
10: Current collector
20: Negative electrode active material layer
21: Negative electrode active material
22: Solid electrolyte
23: Conductive material
24: SEI layer
30: Lithium layer
40: Organic solvent
50: Additives

What is claimed is:

1. A method for manufacturing a negative electrode for an all solid state secondary battery, comprising the steps of:
   (S1) preparing a preliminary negative electrode comprising a current collector, and a negative electrode active material layer formed on at least one surface of the current collector, wherein the negative electrode active material layer contains a plurality of negative electrode active material particles and a solid electrolyte;
   (S2) disposing a lithium layer on the negative electrode active material layer;
   (S3) dipping the preliminary negative electrode having the lithium layer disposed thereon in an organic solvent free of a lithium salt for 1-24 hours to form a SEI layer; and
   (S4) removing the lithium layer.

2. The method according to claim 1, wherein the organic solvent comprises a benzene-based solvent; ether-based solvent; ester-based solvent; amide-based solvent; linear carbonate-based solvent; cyclic carbonate-based solvent; or a mixture of two or more thereof.

3. The method according to claim 1, wherein the organic solvent comprises an additive in step (S3).

4. The method according to claim 3, wherein the additive comprises vinylene carbonate (VC), vinylene ethylene carbonate (VEC), propane sultone (PS), fluoroethylene carbonate (FEC), ethylene sulfate, or a mixture of two or more thereof.

5. The method according to claim 1, wherein the solid electrolyte has an ion conductivity of $10^{-7}$ S/cm or more, and comprises a polymer-based solid electrolyte, oxide-based solid electrolyte, sulfide-based solid electrolyte, or a mixture of two or more thereof.

6. The method according to claim 1, wherein pre-lithiation is carried out by the dipping of the preliminary electrode having the lithium layer disposed thereon in the organic solvent.

7. The method according to claim 6, wherein the pre-lithiation is controlled by adjusting the amount of the lithium layer or time during which the lithium layer is retained on the negative electrode active material layer.

8. The method according to claim 1, wherein the lithium layer is retained on the negative electrode active material layer for 6-48 hours.

9. The method according to claim 1, which further comprises a step of removing the organic solvent after step (S3) or (S4).

10. The method according to claim 1, wherein the organic solvent is a cyclic carbonate.

11. An all solid state secondary battery comprising:
   a positive electrode; a negative electrode prepared according to the method of claim 1; and a solid electrolyte membrane interposed between the positive electrode and the negative electrode,
   wherein the negative electrode active material layer has a solid electrolyte interphase (SEI) layer formed on the whole or at least a part of the surface of the negative electrode active material particles after the step (S3), and
   wherein the all solid state secondary battery has an initial efficiency of 80% or more.

12. The all solid state secondary battery according to claim 11, which has a capacity retention of 75% or more.

13. The method for manufacturing a negative electrode for an all solid state secondary battery according to claim 1, wherein the lithium layer has a thickness of 20-200 μm.

14. The method for manufacturing a negative electrode for an all solid state secondary battery according to claim 5, wherein the polymeric solid electrolyte includes a Lithium salt.

* * * * *